(12) United States Patent
Hawkins

(10) Patent No.: US 9,547,846 B2
(45) Date of Patent: Jan. 17, 2017

(54) METHOD AND APPARATUS FOR THE PROCESSING OF DATA RELATING TO CALENDAR ENTRIES

(75) Inventor: Siavash James Joorabchian Hawkins, Marden (GB)

(73) Assignee: Good Technology Holdings Limited, Waterloo, Ontario (CA)

( * ) Notice: Subject to any disclaimer, the term of this patent is extended or adjusted under 35 U.S.C. 154(b) by 0 days.

(21) Appl. No.: 13/034,493

(22) Filed: Feb. 24, 2011

(65) Prior Publication Data

US 2012/0219133 A1  Aug. 30, 2012

(51) Int. Cl.
- *H04M 1/56* (2006.01)
- *G06Q 10/10* (2012.01)
- *H04M 1/57* (2006.01)
- *H04M 1/725* (2006.01)

(52) U.S. Cl.
CPC .......... *G06Q 10/109* (2013.01); *G06Q 10/107* (2013.01); *H04M 1/575* (2013.01); *H04M 1/72597* (2013.01); *H04M 1/72566* (2013.01)

(58) Field of Classification Search
USPC ......... 379/142.04, 142.03, 131, 128, 207.03, 379/265.05, 266.03, 210.01, 373.03
See application file for complete search history.

(56) References Cited

U.S. PATENT DOCUMENTS

| | | | |
|---|---|---|---|
| 6,735,292 | B1 | 5/2004 | Johnson |
| 7,756,811 | B2 | 7/2010 | Cohen et al. |
| 2003/0222765 | A1 | 12/2003 | Curbow et al. |
| 2004/0203643 | A1* | 10/2004 | Bhogal ............... H04W 8/18 455/414.1 |
| 2004/0243677 | A1 | 12/2004 | Curbow et al. |

(Continued)

FOREIGN PATENT DOCUMENTS

| | | |
|---|---|---|
| CN | 1992759 A | 7/2007 |
| CN | 101304570 A | 11/2008 |

(Continued)

OTHER PUBLICATIONS

International Search Report mailed May 29, 2012, for International Application No. PCT/EP2012/052353.

(Continued)

*Primary Examiner* — Yosef K Laekemariam
(74) *Attorney, Agent, or Firm* — Fish & Richardson P.C.

(57) ABSTRACT

Embodiments of the invention are concerned with processing data relating to calendar entries. In one embodiment processing includes detecting a correspondence between a telephone number and at least one characteristic of a calendar workspace item, and processing data relating to a communications event identified by the telephone number on the basis of the detected correspondence. The processing may include triggering a notification for an incoming communications event, such as a telephone call or text message, that is received by a telephony device.

In another embodiment processing includes detecting a correspondence between at least one characteristic of a stored communications event workspace item and at least one characteristic of a calendar workspace item, and processing data relating to the communications event on the basis of the detected correspondence. This processing may include filtering a plurality of communications event workspace items, and displaying one or more of the filtered items.

28 Claims, 6 Drawing Sheets

(56) References Cited

U.S. PATENT DOCUMENTS

| | | |
|---|---|---|
| 2004/0264660 A1 | 12/2004 | McCullough et al. |
| 2005/0289180 A1 | 12/2005 | Pabla et al. |
| 2006/0080284 A1 | 4/2006 | Masonis et al. |
| 2006/0085419 A1 | 4/2006 | Rosen |
| 2006/0209690 A1 | 9/2006 | Brooke |
| 2006/0224675 A1 | 10/2006 | Fox et al. |
| 2007/0070940 A1* | 3/2007 | Vander Veen ....... G06Q 10/107 370/328 |
| 2007/0276795 A1 | 11/2007 | Poulsen |
| 2007/0281689 A1 | 12/2007 | Altman |
| 2008/0080689 A1* | 4/2008 | Casalaina et al. ....... 379/142.15 |
| 2008/0152097 A1 | 6/2008 | Kent |
| 2008/0205655 A1 | 8/2008 | Wilkins et al. |
| 2009/0054039 A1 | 2/2009 | Van Wijk et al. |
| 2009/0110156 A1 | 4/2009 | Hosteny et al. |
| 2009/0157732 A1 | 6/2009 | Hao |
| 2009/0215469 A1 | 8/2009 | Fisher et al. |
| 2009/0228555 A1 | 9/2009 | Joviak et al. |
| 2010/0015976 A1* | 1/2010 | Issa .................. G06F 17/30699 455/435.1 |
| 2010/0030788 A1 | 2/2010 | Chen et al. |
| 2010/0070877 A1 | 3/2010 | Scott et al. |
| 2013/0002427 A1* | 1/2013 | Bocking et al. .............. 340/540 |

FOREIGN PATENT DOCUMENTS

| | | |
|---|---|---|
| CN | 101702795 A | 5/2010 |
| GB | 2441399 A | 3/2008 |
| WO | 2008027965 A2 | 3/2008 |
| WO | 2008103326 A1 | 8/2008 |

OTHER PUBLICATIONS

International Search Report & Written Opinion dated Oct. 29, 2009 issued on related PCT application No. PCT/US2009/055962.
International Preliminary Report on Patentability dated Mar. 18, 2011 issued on related PCT application No. PCT/US2009/055962.
International Preliminary Report on Patentability dated Sep. 11, 2013 issued on related PCT application No. PCT/EP2012/052353.
Office Action issued in Chinese Application No. 201280019975.8 on Jan. 25, 2016.
Office Action issued in Chinese Application No. 201280019975.8 on Aug. 10, 2016.

* cited by examiner

| Calendar Workspace Item Identifier | Start Time | End Time | Telephony Dialling Number | Contact Workspace Item Identifier |
|---|---|---|---|---|
| calD1 | StartTime1 | EndTime1 | PhoneNumber1 | coID1 |
| calD1 | StartTime1 | EndTime1 | PhoneNumber2 | coID2 |
| calD1 | StartTime1 | EndTime1 | PhoneNumber3 | coID3 |
| calD2 | StartTime2 | EndTime2 | PhoneNumber2 | coID2 |
| calD2 | StartTime2 | EndTime2 | PhoneNumber4 | coID4 |
| ... | ... | ... | ... | ... |

Figure 2

METHOD AND APPARATUS FOR THE PROCESSING OF DATA RELATING TO CALENDAR ENTRIES

FIELD OF THE INVENTION

The present invention relates to methods and apparatus for the processing of data relating to calendar entries. In particular, but not exclusively, the invention relates to the processing of data relating to a set of calendar records defining a plurality of calendar workspace items.

BACKGROUND OF THE INVENTION

Personal information management (PIM) applications are known. These are applications typically executed on a computing device such as a smartphone, a desktop computer, a laptop computer or a tablet computer. Various examples of PIM applications are described below.

PIM applications may include calendar applications used to store, and provide access to, calendar entries, for example in date/time order or according to some other user-defined sort order. The calendar entries are stored as calendar workspace items which typically include calendar item details such as subject, start date/time, end date/time, and an attendee list identifying participants in a meeting which is included as a calendar entry.

PIM applications may include contact management applications (otherwise known simply as "contacts" applications) used to store, and provide access to, contact items for individual contacts and business contacts, for example in alphabetical order or according to some other user-defined sort order. The contact items are stored as contact management workspace items which typically include contact details such as full name, email address, telephone numbers, and postal addresses. Telephone numbers stored in the contact items are typically used to initiate telephone calls and/or to identify details of an incoming telephone call—for example, a telephony application may look up the full name of the contact corresponding to the telephone number associated with an incoming telephone call, and present that to the call recipient along with an alert notification (e.g. an audible alert for the call). The contact items may also include a personalised alert setting which a telephony application may look up to provide an individualised alert notification for an incoming call from that particular contact.

PIM applications may include call history applications used to store, and provide access to, call history lists, for example in date/time order or according to some other user-defined sort order. The call history lists are stored as telephony workspace items which typically include call history details such as telephone numbers for previous call attempts, previously made calls and/or previously received telephone calls.

PIM applications may include messaging applications used to store, and provide access to, message items, for example in date/time order or according to some other user-defined sort order. The message items are stored as message workspace items which typically include message item details such as subject, message date/time, a message recipient list identifying recipients of a message which is included as a message item, and message content. An example of a PIM messaging application is an email application which is used to store, and provide access to, email messages, for example in date/time order or some other order defined by the user. Other examples include text messaging applications for storing and providing access to short messaging services (SMS) messages and/or multimedia messaging services (MMS) messages.

PIM applications may include task list applications used to store, and provide access to, personal task items for example in date/time order or according to some other user-defined sort order. The task items are stored as task list workspace items which typically include task details such as subject, start date/time, due date/time, and a flag identifying whether the task has been completed.

Various methods for processing data relating to calendar entries are known. For example, meeting invitations sent by email may be used by a computing device, upon acceptance by a user, to insert calendar entries into a set of calendar workspace items. Meeting updates may also be sent by email which may be used by a computing device to update existing calendar entries in a set of calendar workspace items.

The present invention aims to improve the processing of data in relation to calendar entries.

SUMMARY OF THE INVENTION

In accordance with one aspect of the present invention there is provided a method for processing data relating to a communications event, comprising:

storing a set of calendar records defining a plurality of calendar workspace items;

detecting a correspondence between a telephone number and at least one characteristic of a calendar workspace item stored in said set of calendar records; and processing data relating to a communications event identified by the telephone number on the basis of the detected correspondence.

By detecting a correspondence between a telephone number and at least one characteristic of a calendar workspace item stored in a set of calendar records, this aspect provides improved data processing functionality in relation to calendar workspace items. In particular, a communications event identified by a telephone number may be correlated with a calendar event, even if such correlation is indirect. A user can thus be provided with an improved set of functions relating to calendar entries which somehow correspond with communications events which are identified by a telephone number.

Communications events in this aspect may include examples such as telephone calls, short messaging service (SMS) messages and/or multimedia messaging service (MMS) messages. Each of these examples are identified by a telephone number.

In one arrangement, processing data relating to the communications event comprises:

receiving data relating to an incoming communications event; and processing said data to trigger a notification for said incoming communications event on the basis of said detected correspondence.

This allows for a notification for an incoming communications event to be configured on the basis of a correspondence between at least one characteristic of the communications event and at least one characteristic of a calendar workspace item.

An example of such a correspondence is where a correspondence between said telephone number and at least one characteristic of a contact management workspace item stored in said set of contact management records is detected, and where a correspondence between at least one characteristic of said contact management workspace item and at least one characteristic of said calendar workspace item is detected.

As a result this aspect allows for an indirect relationship between an incoming communications event and a calendar workspace item to be detected and for a notification for the communications event to be configured as a result.

Alternative arrangements are provided where said method comprises pre-configuring a notification for incoming communications events identified by said telephone number. This allows the configuration of notifications for communications events to be conducted prior to receiving an incoming communications event, so that delays in providing a notification are reduced when receiving the incoming communications event.

The notification may include information relating to the calendar workspace item, and/or may include configuring an alert for the incoming communications event, in order to draw the user's attention to the relationship between the incoming communications event and the calendar workspace item and/or to remind the user of the calendar workspace item.

In accordance with another aspect of the present invention there is provided a method for processing data relating to a communications event, comprising:

storing a set of calendar records defining a plurality of calendar workspace items;

storing a set of communications event records defining a plurality of communications event workspace items, said plurality of communications event workspace items each comprising data relating to a different communications event;

detecting a correspondence between at least one characteristic of a communications event workspace item stored in said set of communications event records and at least one characteristic of a calendar workspace item stored in said set of calendar records; and processing data relating to the communications event on the basis of the detected correspondence.

Preferably, communications events in embodiments of this aspect relate to telephone calls, short messaging service (SMS) messages and/or multimedia messaging service (MMS) messages.

One arrangement of this aspect may include filtering said plurality of communications event workspace items on the basis of the detected correspondence; and generating a filtered set of at least one communications event in response to said filtering.

The arrangement may include displaying at least one of said filtered set of communications events in response to receiving first user input selecting said calendar workspace item.

The user may then select one of the displayed communications events, and a new communications event may then be initiated on the basis of said selected event.

In one arrangement detecting a correspondence between at least one characteristic of a communications event workspace item stored in said set of communications event records and at least one characteristic of a calendar workspace item stored in said set of calendar records may comprise:

detecting a correspondence if a time characteristic of said communications event workspace item corresponds with a time characteristic of said calendar workspace item.

Another arrangement may include storing a set of contact management records defining a plurality of contact management workspace items. Detecting a correspondence between at least one characteristic of a communications event workspace item stored in said set of communications event records and at least one characteristic of a calendar workspace item stored in said set of calendar records may in this arrangement comprise:

detecting a correspondence between at least one characteristic of a communications event workspace item and at least one characteristic of a contact management workspace item, and between at least one characteristic of said contact management workspace item and at least one characteristic of said calendar workspace item.

As a result this aspect allows for a calendar workspace item to be related to one or more communications event workspace items and for information relating to one or more of these communications event workspace items to be displayed as a rich set of information to the user, even if not directly related to the calendar workspace item. This allows the user to review communications events that have occurred in relation to various indirectly related characteristics of a calendar workspace item and, if desired, to initiate new communications events on the basis of these previous communications events. Such communications events may be communications events identified by a telephone number, such as telephone calls, messaging events, etc.

Further features and advantages of the invention will become apparent from the following description of preferred embodiments of the invention, given by way of example only, which is made with reference to the accompanying drawings.

BRIEF DESCRIPTION OF THE DRAWINGS

FIG. 2 shows an exemplary index table populated by an indexing application of the telephony device of FIG. 1.

DETAILED DESCRIPTION OF THE INVENTION

Figure 1:
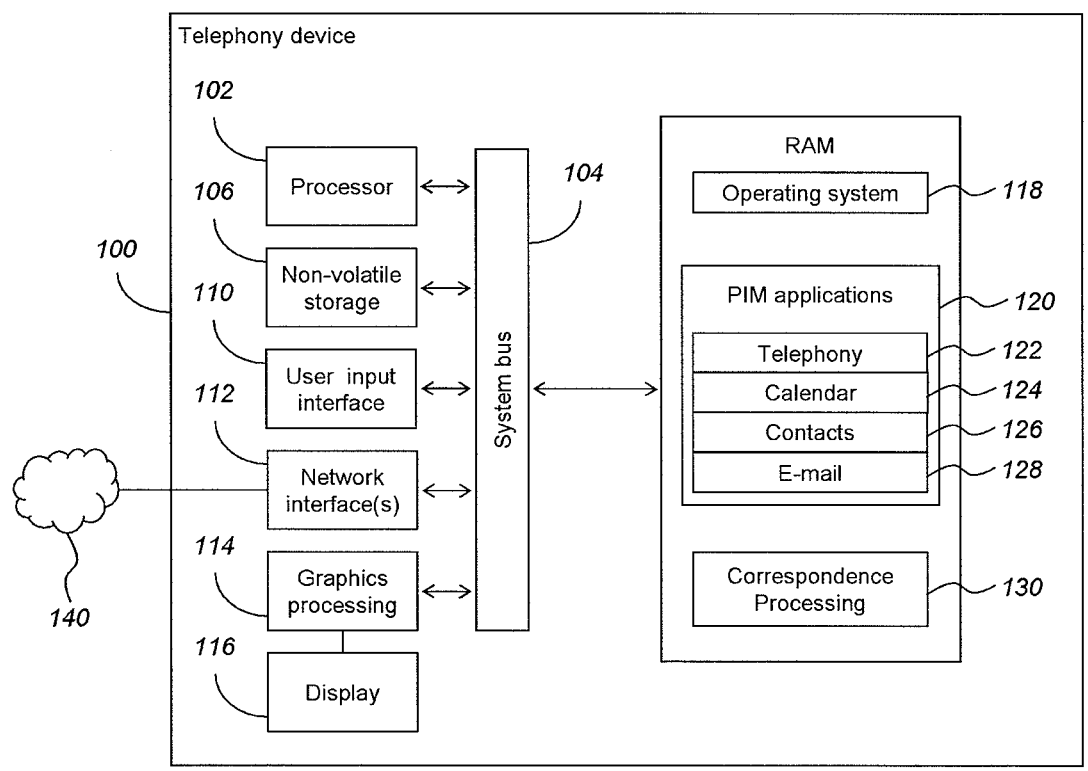
FIG. 1 schematically illustrates the components of a telephony device

FIG. 1 schematically illustrates the components of a telephony device 100, which is an exemplary device used to illustrate the features of embodiments of the present invention. The telephony device 100 may take the form of a mobile phone, smartphone, a personal digital assistant (PDA), a computer comprising telephony functions, etc. The telephony device 100 includes a processor 102 and components connected to a system bus 104, where these components may include a non-volatile storage device 106, random access memory 108, user input interface 110, network interface 112 and graphics processing component 114.

The processor 102, which in this embodiment is a microprocessor, processes instructions stored in the random access memory (RAM) 108 that have been loaded from the non-volatile storage device 106 which could be for example a flash memory or a hard disk drive. These instructions are in the form of computer software in the form of one or more programs that implement an operating system 118 and Personal Information Management (PIM) applications 120. The programs running on the processor 102 may use the RAM 108 as a means of storing and accessing data in the form of electronic signals where the data is used during the execution of the programs.

The operating system 118 is computer software in the form of a program or set of programs whose instructions are loaded from non-volatile storage 106 by the processor 102 and executed when the telephony device 100 is turned on. The operating system 118 may start further programs automatically and/or may allow a user to start further programs, for example by the user using a user interface provided by the operating system 118.

The operating system 118 provides a programmatic interface for programs running on the processor 102 allowing them to request functionality from the operating system 118. This programmatic interface may take the form of procedures, i.e. system calls, which a program running on the processor 102 may use in order to invoke the operating system 118 and request it to provide desired functionality.

The operating system 118 may provide a file system for storing, modifying and accessing files held in non-volatile storage 106. This file system may be accessible to other programs running on the processor 102 via the programmatic interface provided by the operating system 118. The operating system 118 may also provide database access procedures for creating, accessing and modifying databases managed by the operating system 118 (e.g. databases held in non-volatile storage 106). These database access procedures may also be accessible to other programs running on the processor 102 via the programmatic interface provided by the operating system 118.

The telephony device 100 includes a graphics processing component 114 that is able to render graphics in accordance with commands made by programs running on the processor 102 and output these to a display 116 which may reside within the telephony device 100. The display 116 may be a touch screen display. In alternative embodiments the display 116 may be an external component connected to the telephony device 100 via a composite video, component video, Video Graphics Array, Digital Visual Interface, or High-Definition Multimedia Interface connection.

Programs running on the processor 102 can process user input obtained from a user input interface 110 that receives user input from a user input device or devices (not shown). The user input devices may include a touch-screen interface of the display 116. Alternatively or in addition user input devices may include a keypad, keyboard, mouse and/or remote control which may be incorporated within the telephony device 100 or may be connected to it via a wired or wireless connection.

The telephony device 100 also includes a network interface 112 (or a plurality of such interfaces) that allows programs running on the processor 102 to transmit and receive data to and from a number of other devices and systems via a communications network 140 (or a plurality of such networks).

The network interface 112 (or the plurality of such interfaces) may include a radio access network interface (or a plurality of such interfaces) that is able to communicate with a wireless access node such as a base station or a wireless access point that provides access to a communications network 140 (or a plurality of such networks). The network interface 112 (or plurality of such interfaces) may be able to connect to the wireless access node using one or more of a number of radio access technologies including Global System for Mobile Communications (GSM), Universal Mobile Telecommunications System (UMTS), Long Term Evolution (LTE), fixed wireless access (such as IEEE 802.16 WiMax), and wireless networking (such as IEEE 802.11 WiFi). These communications network 140 and/or wireless access node 146 may also provide access to the Internet. The network interface 112 (or the plurality of such interfaces) may also include a modem and/or an Ethernet card or interface for use with a corresponding communications network (or networks) 140 such as the Internet and/or a private data communications network.

The operating system 118 may provide telephony procedures for placing and receiving telephone calls via a wireless access node and/or communications network 140 by using the network interface 112. The operating system 118 may provide messaging procedures for sending and receiving messages such as Short Messaging Service (SMS), Multimedia Messaging Service (MMS) and e-mail via the wireless access node and/or the communications network 140 by using the network interface 112. These telephony procedures and/or messaging procedures may be accessible to other programs running on the processor 102 via the programmatic interface provided by the operating system 118.

The operating system 118 may include a networking program that allows communication between programs running on the processor 112 and external devices via the network interface 112 and communications network 140 (or plurality of such networks) using networking protocols such as (for example) the Transmission Control Protocol (TCP) or the User Datagram Protocol (UDP).

The PIM applications 120 of the telephony device 100 include one or more programs that implement a telephony application 122, a calendar application 124, a contacts application 126, and an e-mail application 128.

Each of the PIM applications 120 may be configured to provide functions and user interfaces for accessing, creating, and editing workspace items. As described in greater detail below, examples of workspace item include a message, communications event record, contact entry, calendar entry, etc. Each workspace item may include a number of characteristics, examples of which are given below. Each workspace item may be stored (e.g. in non-volatile storage 106) in a set of records for that type of workspace item which each PIM application 120 may access.

The telephony application 122 may allow the user of the telephony device 100 to place telephone calls to and receive telephone calls from other telephony devices via the network interface 112 (or plurality of such interfaces) of the telephony device 100. The telephony application may allow the user to place and receive telephone calls to and from telephone numbers that are telephone numbers of telephony devices on a telephone network. A telephone number is a sequence of numeric digits which is used to call one telephone line from another in a public switched telephone network. The telephone number is typically included in the call signalling as a caller ID, also known as CLI (calling line identification), for the calling party when a call setup request is received, and can be used to identify calling parties for incoming calls, by the telephony application.

Other telephony applications (not shown) may allow the user of the telephony device 100 to access, edit, send and receive messages such as short messaging service (SMS) messages, multimedia messaging service (MMS) messages, etc., via the network interface 112 (or plurality of such interfaces) of the telephony device 100. Each message may include characteristics such as message subject, message attachments, message body, message recipients, sender, date sent, etc. Each message may be stored as a workspace item in a set of message records.

The telephony application(s) may store workspace items relating to communications events placed or received using the telephony device 100, such as call history lists, and message lists. Each communications event workspace item may relate to a previous communications event such as a telephone call, SMS message, or MMS message. Each communications workspace event may include characteristics such as the start date/time and duration of the communications event, the telephone numbers of the other parties involved in the communications instance, etc. Each communications event workspace item may be stored in a set of communications event records. The user of the telephony device 100 may initiate new communications events based on a communications event workspace item, e.g. a new telephone call to the same participants as a previous telephone call.

The calendar application 124 allows the user of the telephony device 100 to access and edit one or more calendars. Each calendar may comprise calendar entries which may each include characteristics such as a calendar subject, a location associated with the entry, start and end date/times for the entry, a list of meeting attendees associated with the entry, a list of other items such as documents, or messages associated with the entry, etc. Each calendar entry may be stored as a workspace item in a set of calendar records.

The contacts application 126 may allow the user of the telephony device 100 to access and edit one or more lists of contacts. These lists of contacts may comprise contact entries, where each contact entry may include characteristics relating to a contact which may include the contact's name, associations with other contacts, communications identifiers relating to how that contact may be contacted e.g. via telephone, e-mail, etc. The contacts application 126 may allow the user to access, create, and edit contact entries, and initiate communications instances such as telephone calls, SMS messages and/or MMS messages with the contacts identified by the contact entries. Each contact entry may be stored as a workspace item in a set of contact records.

The e-mail application 128 may allow the user of the telephony device 100 to access, edit, send and receive e-mails via the network interface 112 (or plurality of such interfaces) of the telephony device 100. Each e-mail may include characteristics such as message subject, message attachments, message body, message recipients, sender, date sent, etc. Each e-mail may be stored as a workspace item in a set of e-mail records.

Information relating to calendar workspace items and/or contact workspace items may be received from an external device via the network interface 112 (or plurality of such interfaces) of the telephony device 100. For example, information relating to calendar workspace items and/or contact workspace items may be received from an external device via emails and/or text messages sent to the user of the telephony device 100 and processed by the emails application 128 and/or a telephony application 122, and/or may be received via any protocol for communication between the external device (which could be an enterprise server storing enterprise contact information) and the telephony device 100.

Such information relating to calendar workspace items and/or contact workspace items that is received from an external device may include information relating to attendees for calendar workspace items and/or information relating to associations between contact workspace items which are described in further detail below.

Attendees of calendar entry items and/or associations between contact entries may be manually entered by the user of the telephony device 100. For example, the calendar application 124 may allow the user of the telephony device 100 to enter or select the email address of a person who is to be listed as one of the attendees of a calendar workspace item, or to enter or select a contact that should be associated with another contact.

The meeting attendees of calendar workspace items stored in the calendar records of the PIM applications 120 may typically identify attendees of a calendar entry using an attendee identifier. Each attendee identifier may for example be the email addresses of an attendee of the calendar entry, or could in other examples be the name of the attendee of the calendar entry.

An attendee identifier in a calendar workspace item may be matched with corresponding information in a contact workspace item in order to determine that the contact identified by the contact workspace item is an attendee of the calendar entry identified by the calendar workspace item. For example, the email address of an attendee in a calendar workspace item may be matched with the email address of a contact workspace item in order to determine that the contact identified by that contact workspace item is an attendee of the calendar entry identified by that calendar workspace item.

Matching contact workspace items with calendar workspace items on the basis of attendee identifiers may be time consuming, e.g. if large numbers of calendar workspace items and contact workspace items are stored on the telephony device 100, and therefore may be an unsuitable task to perform on demand when correspondences between calendar workspace items and contact workspace items are required for processing in the embodiments described below. The time needed to match contact workspace items with calendar workspace items may be a particular problem when information regarding such matches is required in close to real time, e.g. in response to the receipt of an incoming communication as is seen in the embodiments below.

A correspondence processing application 130 may thus be configured to access the calendar records and contacts records of the PIM applications 120 and to conduct pre-processing order to determine correspondences between calendar workspace items and contact workspace items stored in those records. Correspondences between calendar workspace items and contact workspace items may be determined on the basis of calendar workspace item attendee identifiers and contact workspace item email addresses as described above.

The correspondence processing application 130 may be configured to determine correspondences between calendar workspace items and contact workspace items regularly whilst the telephony device 100 is operating, and/or in response to the receipt of new calendar workspace items and/or contact workspace items, and/or in response to the receipt of changes to existing calendar workspace items and/or contact workspace items. The correspondence processing application 130 thus pre-processes calendar workspace items and contact workspace items so that correspondences between these may be determined before information relating to such correspondences is used by the following embodiments.

The correspondence processing application 130 may store determined correspondences between calendar workspace items and contact workspace items in an index table. For each correspondence between a calendar workspace item and a contact workspace item determined by the correspondence processing application 130, the correspondence processing application 130 may store an entry in the index table containing an identifier of the calendar workspace item, an identifier of the contact workspace item, and selected information from these two workspace items, such as the start and end date/times of the calendar entry identified by the calendar workspace item, and the telephone number of the contact identified by the contact workspace item.

FIG. 2 shows an exemplary index table, populated by the correspondence processing application 130, which contains information relating to determined correspondences between calendar workspace items and contact workspace items. As can be seen from the exemplary index table of FIG. 2, a calendar workspace item in the index table may correspond with one or more contact workspace items. The exemplary index table of FIG. 2 also shows that a contact workspace item may correspond with one or more calendar workspace items. The exemplary index table of FIG. 2 also shows that each entry that relates to a correspondence between a calendar workspace item and a contact workspace item includes the start and end date/times for the calendar workspace item and the telephone number of the contact workspace item.

In addition to determining a correspondence between a calendar workspace item and a contact workspace item on the basis of the contact workspace item relating to an attendee of the calendar entry identified by the calendar workspace item as described above, a correspondence may also be determined between a calendar workspace item and a first contact workspace item on the basis of a correspondence that has already been made between the calendar workspace item and a second contact workspace item, provided that an association also exists between the first contact workspace item and the second contact workspace item.

For example, a correspondence between a calendar workspace item and a first contact workspace item may be determined if a second contact workspace item is an attendee of the calendar workspace item, and if the second contact workspace item is associated with the first contact workspace item in the set of records of the contacts application 126. The association between the first contact workspace item and the second contact workspace item may for example indicate that the first contact workspace item is the personal assistant of the second contact workspace item. Other associations could exist between the first contact workspace item and the second contact workspace item, such as that the first contact workspace item is a colleague of the second contact workspace item, a family relation, etc.

The correspondence processing application 130 may use an association between a first and a second contact workspace items to determine additional entries in the index table (such as that of FIG. 2), i.e. by storing an entry in the index table relating to a correspondence between a first contact workspace item and a calendar workspace item if a second workspace item has been determined to correspond with that calendar workspace item. The index table populated by the correspondence processing application 130 may thus contain entries relating to direct correspondences between calendar workspace items and contact workspace items (i.e. where a contact is an attendee of a calendar entry), and indirect correspondences between calendar workspace items and contact workspace items (i.e. where a contact is associated with an attendee of a calendar entry).

The correspondences between calendar workspace items and contact workspace items in the indexing table populated by the correspondence processing application 130 may be used in the following embodiments of, as is now described.

In a first embodiment, one or more PIM applications 120 of the telephony device 100 are configured to receive an incoming communications event and to configure a notification for this communications event. This notification may be configured on the basis of a correspondence between the telephone number of the communications event and at least one characteristic of a calendar workspace item, as is now described in relation to the steps of FIG. 3.

The telephony application 122 may initially receive an incoming communications event (step 300). The incoming communications event may be identified by a telephone number, and may be a telephone call, or a text message (such as an SMS or MMS message). When receiving the incoming communications event, the telephony application 122 may obtain the telephone number for the communications event, e.g. via caller ID information provided with a telephone call, or via a originating telephone number provided with a SMS or MMS message.

The telephony application 124 may then process the index table that has been populated by the correspondence processing application 130 as described above in order to obtain a list of corresponding calendar workspace items (step 302). The telephony application 124 may search the index table for entries that contain the telephone number of the incoming communications event, in order to obtain the list of corresponding calendar workspace items, which thus contains the calendar workspace items that have been determined by the correspondence processing application 130 to correspond with the contact workspace item containing the telephone number of the incoming communications event.

If the list of corresponding calendar workspace items determined in step 302 contains no calendar workspace items, the telephony application 122 may continue to process the incoming communications event according to a default configuration.

Otherwise if the list of corresponding calendar workspace items determined in step 302 contains one or more calendar workspace items, the telephony application 122 may then process the list in order to determine whether there is a calendar workspace item in the list that has one or more time characteristics that are detected to correspond with the date/time of when the incoming communications event is received (step 304). If there is such a calendar item, it is selected for processing by the telephony application 122.

The one or more time characteristics of a calendar workspace item may be retrieved directly from the index table (which may contain this information as described above).

For example, if there is a calendar workspace item that begins within an hour of when the incoming communications event is received, then that calendar workspace item may be selected for processing. A calendar workspace item may additionally or alternatively be selected for processing if the calendar workspace item ends up to an hour before when the incoming communications event is received, and/or if the calendar workspace item is currently occurring when the incoming communications event is received.

If no selected calendar workspace item is determined in step 304, the telephony application 122 may continue to process the incoming communications event according to a default configuration.

Otherwise if a selected calendar workspace item is determined in step 304, the telephony application 122 then configures a notification for the communications event based on the correspondence between at least one characteristic of the communications event and at least one characteristic of the selected calendar workspace item (step 306).

By using the index table populated by the correspondence processing application 130, a correspondence between the incoming communications event and the selected calendar workspace item is thus established if the telephone number by which the communications event is identified matches that of a contact who is an attendee of the meeting identified by the selected calendar workspace item. A correspondence may additionally or alternatively be established if the telephone number by which the communications event is identified matches that of a contact who is associated with another contact who is an attendee of the meeting identified by the selected calendar workspace item.

Based on the correspondence between the incoming communications event and the selected calendar item, the telephony application 122 may configure a notification for the communications event that may draw the user's attention to the selected calendar item, as well as to the communications event.

The telephony application 122 may for example configure a notification that includes displaying information relating to the selected calendar workspace item.

The information relating to the selected calendar workspace item may be displayed as the communications event is received. For example, if a telephone call is received by the telephony device 100, the telephony application 122 may display information relating to the selected calendar workspace item on the display 116 of the telephony device 100 whilst the telephony device 100 provides a ringing alert to indicate that there is an incoming telephone call.

In another example, the telephony application 122 could alternatively or in addition display information relating to the selected calendar workspace item during a received telephone call, and/or after a received telephone call. The telephony application 122 could alternatively or in addition display information relating to the selected calendar workspace item when a message (e.g. SMS and/or MMS) is received by the telephony device 100 and/or whenever that message is read by the user.

The displayed information relating to the selected calendar workspace item may include the subject of the calendar workspace item, one or more time characteristics of the calendar workspace item, and an indication that the communications event being received relates to the calendar workspace item. For example, if a telephone call is received by the telephony device 100, the telephony application 122 may display information relating to the selected calendar workspace item such as "Incoming call from John Smith. 'Review Meeting' with John Smith at 1:30 pm today".

Figure 4:
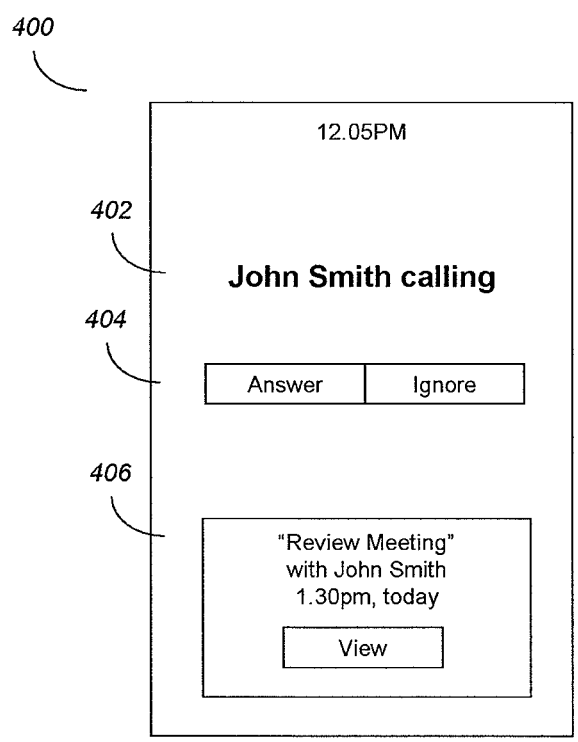
FIG. 4 illustrates an exemplary screen displayed by the display of the telephony device of FIG. 1.
Figure 5:
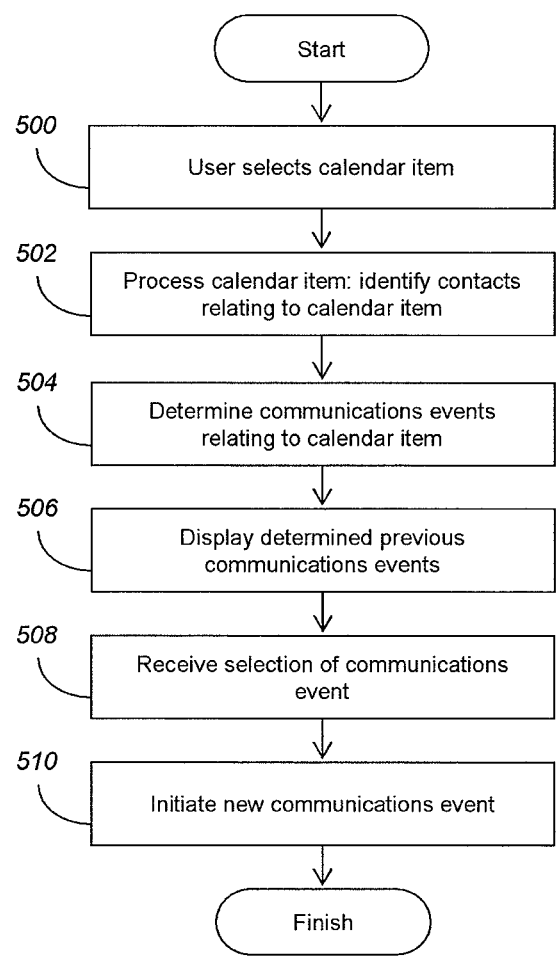
FIG. 5 illustrates steps performed by one or more personal information management applications of the telephony device of FIG. 1.

FIG. 4 illustrates an exemplary screen 400 displayed by the display 116 of the telephony device 100, where information relating to a corresponding calendar workspace item is displayed as a communications event is received by the telephony device 100. The screen 400 includes an indication 402 that a new telephone call is being received, and corresponding touch-screen buttons 404 that allow the user of the telephony device 100 to accept or ignore the incoming call. The screen also includes displayed information relating to a calendar workspace item, 406, that has been detected as corresponding to the incoming telephone call. The displayed information relating to a calendar workspace item 406 includes a touch-screen button that allows the user of the telephony device 100 to view further details relating to the calendar workspace item e.g. using the calendar applications 124.

From the above description it can be seen that the first embodiment allows the telephony device 100 to alert the user to a detected correspondence between the telephone number of an incoming communications event and a calendar workspace event. In this way the telephony device 100 is able to alert the user to an incoming communications event that may be relevant to an upcoming, current, or recent meeting identified in a calendar workspace event. The user of the telephony device 100 is thus better able to identify communications events relating to these meetings.

A second embodiment will now be described. The second embodiment may proceed according to the first embodiment described above. However in addition, or as an alternative, to displaying information relating to a calendar workspace item if a correspondence is detected between the telephone number of an incoming communications event and a calendar workspace item, in the second embodiment configuring a notification for the incoming communications event includes configuring an alert for the incoming communications event notification.

The telephony device 100 may be configured to provide alerts for incoming communications events according to a current default alert mode. For example, the telephony device may be set to one of several default alert modes such as "Outdoors", "Office", "Meeting, "Silent", etc. These default alert modes may indicate the alert the telephony device 100 may use when an incoming communications event is detected, including for example one of several audible alerts played via a sound output device such as a speaker. Default alert modes may additionally or alternatively indicate the volume of such audible alerts including whether no audible alert should be played, and/whether to use other alerts such as vibrating alerts or visible alerts (e.g. flashing the display 116 and/or lights in the telephony device 100).

Figure 3:
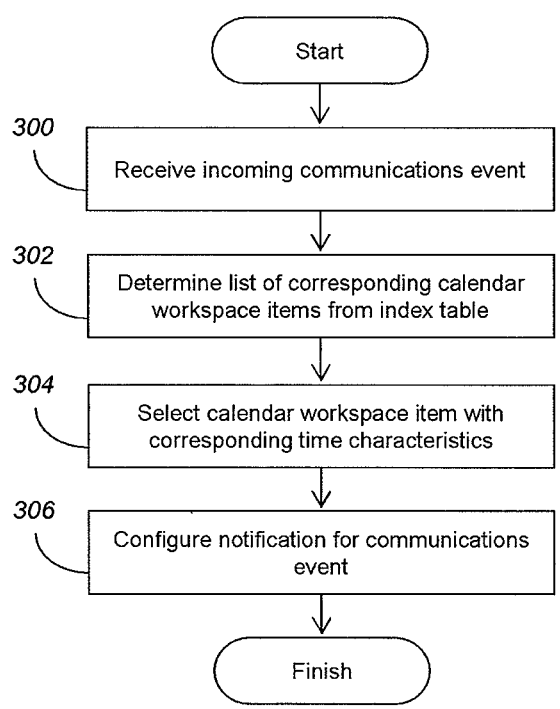
FIG. 3 illustrates steps performed by one or more personal information management applications of the telephony device of FIG. 1.

When configuring a notification for an incoming communications event on the basis of a correspondence between the telephone number of that event and a calendar workspace item in step 306 of FIG. 3, the telephony application 122 may determine that the current default alert mode should be altered in order to draw the user's attention to the detected correspondence, as well as to the incoming communications event.

For example, if the current default alert mode indicates that a first audible alert should be played when an incoming communications event is detected, in step 306 a second audible alert could instead be configured to be played on the basis of a correspondence between the telephone number of the incoming communications event and a calendar workspace item. Alternatively or in addition the volume of the alert could be changed, and/or vibrating and/or visible alerts could be changed. In another example, an audible and/or vibrating alert may be configured in step 306 even if the telephony device 100 has been placed in a "silent" alert mode (which indicates no audible and/or vibrating alert should be used).

From these examples, it can be seen that the second embodiment allows the telephony device 100 to alert the user to a detected correspondence between the telephone number of an incoming communications event and a calendar workspace event, as well as the communications event itself, even in circumstances where the telephony device 100 is configured to use an alert mode that would otherwise prevent alerts from being made. In this way the telephony device 100 is able to alert the user to an incoming communications event that may be relevant to an upcoming, current, or recent calendar entry identified in a calendar workspace event. The user of the telephony device 100 is thus better able to identify communications events relating to these meetings.

The second embodiment may otherwise proceed according to the first embodiment.

A third embodiment will now be described. In the third embodiment, the user may select to view a calendar workspace item, and a filtered plurality of communications event workspace items may be displayed in relation to that calendar workspace item, as is now described in relation to the steps of FIG. 4.

Initially the user of the telephony device 100 selects a calendar workspace item to view (step 500). The user may for example select to view a particular calendar workspace item whilst using the calendar application 124 to view the calendar records held on the telephony device 100, or by selecting to view the calendar workspace item that the telephony application 122 has determined relates to a communications event in accordance with the first embodiment (e.g. using the exemplary interface 406 of FIG. 4).

The calendar application 124 thus receives user input selecting a calendar workspace item, e.g. via a touch-screen interface of the display 116 of the telephony device 100.

In response to the receipt of user input selecting the calendar workspace item, the calendar application 124 processes the calendar workspace item in order to determine a list of contact workspace items that correspond to the calendar workspace item (step 502).

The list of contact workspace items that correspond to the calendar workspace item may be determined by the calendar application 124 processing the index table populated by the correspondence processing application 130, and including in the list the contact workspace items of the entries in the index table that contain the selected calendar workspace item.

The list of contact workspace items may thus contain the contacts that are attendees of the calendar entry identified by the calendar workspace item. The list of contact workspace items may also contain the contacts that are associated with contacts who are attendees of the calendar entry identified by the calendar workspace item.

The calendar application 124 then determines communications event workspace items stored in the communications event records of the PIM applications 120 that relate to the calendar workspace item selected by the user (step 504). The calendar application 124 may do this by filtering the plurality of communications event workspace items held in the communications event records of the PIM applications 120 on the basis of a correspondence between at least one characteristic of each communications event workspace item and at least one characteristic of the calendar workspace item selected by the user.

In order to do this, the calendar application may filter the communications event workspace items in the communications event records on the basis of a correspondence between at least one characteristic of a communications event workspace item and at least one characteristic of the contact workspace items that have been determined to correspond (i.e. in step 502) with the calendar workspace item selected by the user.

A correspondence between a particular communications event workspace item and a contact workspace item may be determined if the telephone number whereby that communications event workspace item is identified matches that of the party identified by a contact workspace item in the list of contact workspace items determined step 502.

In this way, a correspondence between a communications event workspace item and the selected calendar workspace item is established if the telephone number by which the communications event workspace item is identified matches that of a contact who is an attendee of the meeting identified by the selected calendar workspace item. A correspondence may additionally or alternatively be established if the telephone number by which the communications event workspace item is identified matches that of a contact who is associated with another contact who is an attendee of the meeting identified by the selected calendar workspace item.

Each of the communications event workspace items in the communications event records of the PIM applications 120 may be filtered in this way so that a filtered set of communications event workspace items is determined. The filtered set of communications event workspace items may only contain a communications event workspace item if a correspondence between the communications event workspace item and the selected calendar workspace item is established according to the above procedure.

The calendar application 124 may then display information relating to the selected calendar item and information relating to at least one of the communications event workspace items in the filtered set of communications event workspace items (step 506).

The calendar application 124 may for example display information relating to the selected calendar item in a first area of the display 116 of the telephony device, and information relating to at least one of the filtered communications event workspace items in a second area of the display.

Figure 6:
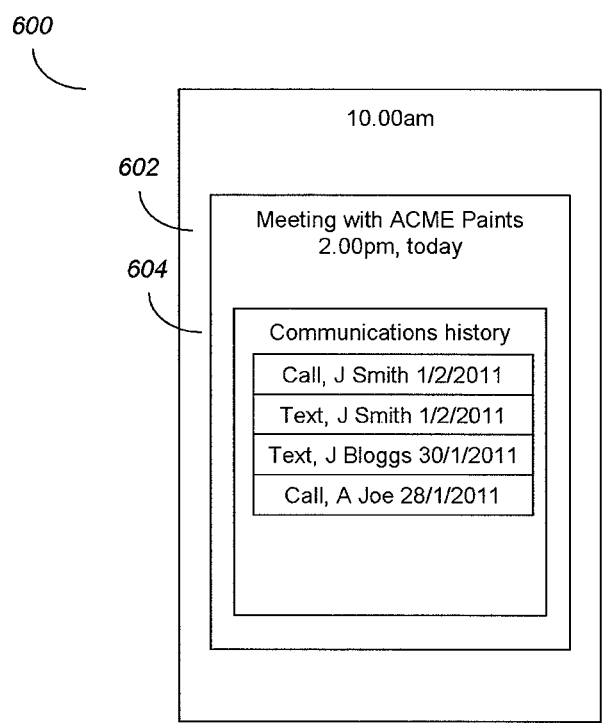
FIG. 6 illustrates an exemplary screen displayed by the display of the telephony device of FIG. 1.

FIG. 6 illustrates an exemplary screen 600 displayed by the display 116 of the telephony device 100, where communications event workspace items relating to a selected calendar workspace item are displayed. The screen 600 includes information relating to the selected calendar workspace item, 602. Also displayed is information relating to communications event workspace items, 604, that have been filtered from the communications event records, as they have been determined to correspond with the calendar workspace item.

Once information relating to communications event workspace items that have been filtered from the communications event records has been displayed, the user may choose to select one of the communications event workspace items, e.g. by pressing on a touch-screen interface of the display 116 at the displayed position of the selected communications event workspace item. The calendar application 124 thus receives user input selecting a communications event workspace item, e.g. via a touch-screen interface of the display 116 of the telephony device 100 (step 508).

In response to receiving the selection of a communications event workspace item, the calendar application 124 may instruct the telephony application 122 to initiate a new communications event on the basis of the selected communications event workspace item (step 510).

If the communications event workspace item relates to a telephone call between the telephony device 100 and another party (or plurality of other parties) identified by a telephone number (or plurality of such identifiers), the telephony application 122 may for example initiate a new telephone call with that party (or those parties) using that number (or numbers). If the communications event workspace item relates to a message such as an SMS message or an MMS message, the telephony application 122 may instead initiate the composition of a new such message to the other party (or parties).

The third embodiment thus allows a user of the telephony device 100 to easily view communications events that took place in relation to a meeting identified by a calendar workspace item in the calendar records of the PIM applications, and to initiate new communications events based on those communications events that have taken place in relation to the meeting.

The above embodiments are to be understood as illustrative examples of the invention.

In alternative embodiments, the telephony application may additionally or alternatively allow the user to place and receive video calls to and from telephone numbers that are telephone numbers of telephony devices on a telephone network. Video calls may allow for video and audio communication between the telephony devices.

In an alternative arrangement of the first and/or second embodiments, a notification may be configured before, during and/or after an outgoing communications event is made by the user, in order to remind the user of a calendar workspace item that is relevant to the outgoing communications event that he/she is placing.

In an alternative arrangement of the first and/or second embodiments, notifications for communications events may be pre-configured prior to the arrival of such communications events.

In this arrangement, rather than operating according to the steps of FIG. 3, the telephony application 122 may begin by selecting a calendar workspace item from the set of calendar records of the PIM applications 120.

A calendar workspace item may be selected if one or more time characteristics of the calendar entry identified by the calendar workspace item correspond with the current date/time. For example, if there is a calendar workspace item that begins within an hour of the current date/time, then that calendar workspace item may be selected for processing. A calendar workspace item may additionally or alternatively be selected for processing if the calendar workspace item ends up to an hour before the current date/time, and/or if the calendar workspace item is currently occurring.

The telephony application 122 may then process the index table populated by the correspondence processing application 130 in order to identify a list of telephone numbers and a corresponding list of contact workspace items that have been determined by the correspondence processing application 130 to correspond to the selected calendar workspace item.

The telephony application 122 may then pre-configure notification settings for each of the telephone numbers in the list of telephone numbers by pre-configuring individual notification settings for each contact workspace item corresponding to a telephone number in the list of telephone numbers.

For example, the telephony application 122 may pre-configure a non-default name entry for the contact workspace item corresponding to a telephone number in the list of telephone numbers, in order to allow information relating to the selected calendar workspace item to be displayed if an incoming communications event is received from that telephone number (e.g. in a similar way to the first embodiment). If the name entry for the contact workspace item is "John Smith", the telephony application 122 may alter the name entry to be "John Smith—Meeting at ACME Paints, 2:30 pm" in order to pre-configure information to be displayed in relation to any incoming communications events that may be received for that contact workspace item. In this way, if a call or text message is received from a telephone number of this contact workspace item whilst the selected calendar workspace item remains selected, the altered name entry containing information relating to the selected calendar workspace item may be displayed.

In another example, the telephony application 122 may pre-configure the default alert style for the contact workspace item corresponding to a telephone number in the list of telephone numbers, in order to allow an alert drawing the user's attention to the selected calendar workspace item to be provided if an incoming communications event is received from that telephone number (e.g. in a similar way to the second embodiment). Rather than altering the default alert configuration for all incoming communications events in accordance with the second embodiment, in this example only the default alert configuration for the contact workspace item may be altered. In this way, if a call or text message is later received from a telephone number of this contact workspace item whilst the selected calendar workspace item remains selected, the telephony device 100 will use the altered alert configuration in order to draw the user's attention to an incoming communications event that may be relevant to an upcoming, current, or recent calendar entry identified in a calendar workspace event.

In this arrangement, the telephony application 122 may regularly process the set of calendar records in order to determine the selected calendar workspace item as above.

During this processing of the set of calendar records a calendar workspace item that has been selected may stop being the selected calendar workspace item, e.g. because it relates to a calendar entry that now occurred more than an hour ago. In this case, the telephony application must process the list of telephone numbers and corresponding list contact workspace items that have been determined by the correspondence processing application 130 to correspond to that calendar workspace item, in order to return the name entries and/or alert settings of those calendar workspace items to their default settings. The telephony application 122 may then identify a new selected calendar workspace item and configure notifications for that calendar workspace item.

As may be seen from the examples in this arrangement, this arrangement allows the configuration of notifications for communications events to be conducted prior to receiving an incoming communications event, so that delays in providing a notification are reduced when receiving the incoming communications event.

In an alternative arrangement of the first and/or second embodiment, a communications event may be detected to correspond with a plurality of calendar workspace events (i.e. there may be a plurality of selected calendar workspace items) in step 304, rather than a single calendar workspace event. In this case, a single calendar workspace event may be selected from the plurality of calendar workspace events according to a filtering procedure, for example by selecting the calendar workspace event that is occurring at a date/time that most closely corresponds with that of the communications event. Alternatively, information relating to two or more of the plurality of calendar workspace items may be displayed if the telephony device is operating according to the first embodiment.

In an alternative arrangement, the telephony device 100 may operate according to the second embodiment without displaying information relating to a calendar workspace event in accordance with the first embodiment.

In an alternative arrangement to the third embodiment, in step 504 communications event workspace items may instead be filtered on the basis of whether a time characteristic of a communications event workspace item corresponds with a time characteristic of the selected calendar workspace item. In this alternative arrangement, filtering may be conducted such that a communications event workspace item is included in the filtered set of communications workspace items if it began and/or ended within a pre-defined amount of time before, and/or within a pre-defined amount of time after when the selected calendar workspace item occurs.

In alternative embodiments, the telephony device 100 may not comprise a correspondence processing application 130. In this case an index table is not populated and is not used to determine correspondences between calendar workspace items and contact workspace items and/or telephone numbers in the above embodiments. Instead, where it is necessary to determine correspondences between calendar workspace items and contact workspace items and/or telephone numbers in the above embodiments, the telephony application 122 and/or calendar application 124 may determine such correspondences by processing the calendar records and the contacts records of the PIM applications on demand, rather than using the correspondence processing application 130 to pre-process these records and determine such correspondences.

For example, associations between calendar workspace items and contact workspace items may not be automatically determined until a communications event relating to a particular contact workspace item is received (i.e. in the first and second embodiments) or until a particular calendar workspace item is selected (i.e. in the third embodiment).

It is to be understood that the PIM applications 120 could be implemented as a single program, as a plurality of programs, as part of another program such as the operating system 118 of the device, or any combination of the above.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method for processing data relating to communications events in a telephony device, the method comprising:
   storing a set of user-editable calendar workspace items and user-editable contact workspace items;
   in response to an incoming communications event at the telephony device, the telephony device:
      detecting a correspondence between a telephone number relating to the incoming communications event and a telephone number associated with an attendee of a meeting identified in a calendar workspace item stored in the set of calendar workspace items;
      detecting a correspondence between the telephone number and at least one characteristic of a contact workspace item stored in the set of contact workspace items;
      detecting a correspondence between at least one characteristic of the contact workspace item and at least one characteristic of the calendar workspace; and
      configuring a notification for the incoming communications event on the basis of the detected correspondence, the notification including information relating to the calendar workspace item associated with the telephone number relating to the incoming communications event.

2. The method of claim 1, wherein the notification is configured based on the telephone number prior to arrival of the incoming communications event.

3. The method of claim 1, wherein the notification comprises a graphical user interface notification displaying information relating to the calendar workspace item.

4. The method of claim 1, wherein the notification includes an alert for the incoming communications event.

5. The method of claim 4, wherein the alert for the incoming communications event is as an exception to a default alert mode.

6. The method of claim 1, wherein a correspondence is detected between at least one time characteristic of the calendar workspace item and at least one time characteristic relating to the incoming communications event.

7. The method of claim 1, the method further comprising:
   storing a set of user-editable contact workspace items; and
   in further response to the incoming communications event at the telephony device, the telephony device:
      detecting a correspondence between the telephone number and at least one characteristic of a contact workspace item stored in the set of contact workspace items; and
      detecting a correspondence between at least one characteristic of the contact workspace item and at least one characteristic of the calendar workspace item.

8. The method of claim 7, the method further comprising:
   in further response to the incoming communications event at the telephony device, the telephony device:
   detecting a correspondence between at least one characteristic of the contact workspace item and at least one characteristic of the calendar workspace item in response to determining that the contact workspace item identifies the attendee of the meeting identified in the calendar workspace item.

9. The method of claim 7, the method further comprising:
   in further response to the incoming communications event at the telephony device, the telephony device:
   detecting a correspondence between at least one characteristic of the contact workspace item and at least one characteristic of the calendar workspace item in response to determining that the contact workspace item is associated with a further contact workspace item that identifies the attendee of the meeting identified in the calendar workspace item.

10. The method of claim 7, the method further comprising:
    in further response to the incoming communications event at the telephony device, the telephony device:
    detecting a correspondence between the telephone number and at least one characteristic of the contact workspace item stored in the set of user-editable contact workspace items in response to determining that the telephone number matches that of a party identified in the contact workspace item.

11. The method of claim 1, wherein the incoming communications event is receipt of a telephone call and the telephone number identifies a party to the telephone call.

12. The method of claim 1, wherein the incoming communications event is receipt of a short messaging service (SMS) message and the telephone number identifies a party to the SMS message.

13. A The method of claim 1, wherein the incoming communications event is receipt of a multimedia messaging service (MMS) message and the telephone number identifies a party to the MMS message.

14. A computer program product comprising a non-transitory computer-readable storage medium having computer readable instructions stored thereon, the computer readable instructions being executable by a telephony device to cause the telephony device to perform a method for processing data relating to communications events stored as a set of user-editable calendar workspace items, the computer-readable storage medium storing contact information as a set of user-editable contact workspace items, the method comprising:
 in response to an incoming communications event at the telephony device, the telephony device:
  detecting a correspondence between a telephone number relating to the incoming communications event at the telephony device and a telephone number associated with an attendee of a meeting identified in a calendar workspace item stored in the set of calendar workspace items;
  detecting a correspondence between the telephone number and at least one characteristic of a contact workspace item stored in the set of contact workspace items;
  detecting a correspondence between at least one characteristic of the contact workspace item and at least one characteristic of the calendar workspace; and
  configuring a notification for the incoming communications event on the basis of the detected correspondence, the notification including information relating to the calendar workspace item associated with the telephone number relating to the incoming communications event.

15. A telephony device for processing data relating to communications events, the telephony device being configured to:
 store a set of user-editable calendar workspace items and a set of user-editable contact workspace items;
 in response to an incoming communications event at the telephony device:
  detect a correspondence between a telephone number relating to the incoming communications event at the telephony device and a telephone number associated with an attendee of a meeting identified in a calendar workspace item stored in the set of calendar workspace items;
  detect a correspondence between the telephone number and at least one characteristic of a contact workspace item stored in the set of contact workspace items;
  detect a correspondence between at least one characteristic of the contact workspace item and at least one characteristic of the calendar workspace; and
  configure a notification relating for the incoming communications event on the basis of the detected correspondence, the notification including information relating to the calendar workspace item associated with the telephone number relating to the incoming communications event.

16. A method for processing data relating to a communications event, the method comprising:
 storing a set of user-editable calendar workspace items;
 storing a set of previous communications event workspace items;
 receiving a first user input to select a calendar workspace item in the set of user-editable calendar workspace items;
 in response to the first user input, determining that a previous communications event workspace item stored in the set of previous communications event workspace items relates to the selected calendar workspace item by:
  determining a contact workspace item that corresponds to the selected calendar workspace item; and
  determining that at least one characteristic of the previous communications event workspace item matches at least one characteristic of the contact workspace item that corresponds to the selected calendar workspace item; and
 in response to determining that the previous communications event workspace item stored in the set of previous communications event workspace items relates to the selected calendar workspace item, providing information relating to the selected calendar workspace item and the previous communications event workspace item.

17. The method of claim 16, the method further comprising:
 filtering the set of previous communications event workspace items on the basis of a correspondence between at least one characteristic of each communications event workspace item and the at least one characteristic of the selected calendar workspace item; and
 generating a filtered set of at least one communications event workspace item in response to the filtering.

18. The method of claim 17, further comprising:
 in response to receiving the first user input, displaying at least one of the filtered set of communications event workspace items.

19. The method of claim 18, the method further comprising:
 receiving a second user input selecting one of the displayed filtered set of communications event workspace items; and
 initiating a new communications event on the basis of the one of the displayed filtered set of communications event workspace items.

20. The method of claim 19, wherein detecting a correspondence between at least one characteristic of a communications event workspace item and at least one characteristic of the calendar workspace item comprises:
 detecting a correspondence between a time characteristic of the communications event workspace item and a time characteristic of the calendar workspace item.

21. The method of claim 16,
 wherein determining that at least one characteristic of the previous communications event workspace item matches at least one characteristic of the contact workspace item that corresponds to the selected calendar workspace item comprises determining that a telephone number identified by the previous communications event workspace item matches that of a contact identified by the contact workspace item, the contact is or is associated with an attendee of a meeting identified by the selected calendar workspace item.

22. The method of claim 16, wherein the communications event workspace item relates to a telephone call and a telephone number identifies a party to the telephone call.

23. A computer program product comprising a non-transitory computer-readable storage medium having computer readable instructions stored thereon, the computer readable instructions being executable by a computerized device to cause the computerized device to perform a method for processing data relating to communications events, the method comprising:

storing a set of user-editable calendar workspace items;
storing a set of previous communications event workspace items;
receiving a first user input to select a calendar workspace item in the set of user-editable calendar workspace items;
in response to the first user input, determining that a communications event workspace item stored in the set of communications event workspace items relates to the selected calendar workspace item by:
  determining a contact workspace item that corresponds to the selected calendar workspace item; and
  determining that at least one characteristic of the previous communications event workspace item matches at least one characteristic of the contact workspace item that corresponds to the selected calendar workspace item; and
in response to determining that the previous communications event workspace item stored in the set of previous communications event workspace items relates to the selected calendar workspace item, providing information relating to the selected calendar workspace item and the previous communications event workspace item that relates to the selected calendar workspace item.

24. A telephony device for processing data relating to a communications event, wherein the device is configured to:
store a set of user-editable calendar workspace items;
store a set of previous communications event workspace items;
receive a first user input to select a calendar workspace item in the set of calendar workspace items;
in response to the first user input, determine that a previous communications event workspace item stored in the set of previous communications event workspace items relates to the selected calendar workspace item by:
  determining a contact workspace item that corresponds to the selected calendar workspace item; and
  determining that at least one characteristic of the previous communications event workspace item matches at least one characteristic of the contact workspace item that corresponds to the selected calendar workspace item; and
in response to determining that the previous communications event workspace item stored in the set of previous communications event workspace items relates to the selected calendar workspace item, provide information relating to the selected calendar workspace item and the previous communications event workspace item that relates to the selected calendar workspace item.

25. The method of claim 1, the method further comprising:
providing information relating to the calendar workspace item on the basis of the detected correspondence.

26. The method of claim 2, wherein the telephone number corresponds to at least one characteristic of one of the set of calendar workspace items.

27. The method of claim 1, wherein the notification is a first notification and the communication event is a first communication event, the method further comprising:
in further response to the incoming communications event at the telephony device, the telephony device:
configuring a second notification, different from the first notification, in response to detecting that a telephone number relating to a second communications event, different from the first communications event, does not correspond to at least one characteristic of the calendar workspace item.

28. A non-transitory, computer-readable medium having computer readable instructions stored thereon, the computer readable instructions being executable by a processor of a computing device in order to cause the computing device to perform a method for processing data relating to communications events, the method comprising:
storing a set of user-editable calendar workspace items;
in response to an incoming communications event at a telephony device:
  detecting a correspondence between a telephone number relating to the incoming communications event and a telephone number associated with an attendee of a meeting identified in a calendar workspace item stored in the set of calendar workspace items;
  detecting a correspondence between the telephone number and at least one characteristic of a contact workspace item stored in the set of contact workspace items;
  detecting a correspondence between at least one characteristic of the contact workspace item and at least one characteristic of the calendar workspace; and
  processing data relating to the incoming communications event on the basis of the detected correspondence.

* * * * *